(12) United States Patent
Emoto

(10) Patent No.: US 12,202,482 B1
(45) Date of Patent: Jan. 21, 2025

(54) VEHICLE CONTROL METHOD AND VEHICLE CONTROL DEVICE

(71) Applicant: Nissan Motor Co., Ltd., Yokohama (JP)

(72) Inventor: Shuhei Emoto, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/683,695

(22) PCT Filed: Sep. 1, 2021

(86) PCT No.: PCT/JP2021/032161
§ 371 (c)(1),
(2) Date: Feb. 14, 2024

(87) PCT Pub. No.: WO2023/032092
PCT Pub. Date: Mar. 9, 2023

(51) Int. Cl.
*B60W 30/16* (2020.01)
*B60W 30/18* (2012.01)

(52) U.S. Cl.
CPC .... *B60W 30/162* (2013.01); *B60W 30/18163* (2013.01); *B60W 2554/802* (2020.02)

(58) Field of Classification Search
CPC ............ B60K 2310/20; B60K 2310/30; B60T 2201/02; B60T 2201/022; B60W 30/162; B60W 30/18163; B60W 2554/802; B60W 30/16; B60W 30/17; B60W 2754/30; B60W 2520/10; B60W 30/09; B60W 10/20; B60W 30/143; B60W 2554/801; B60W 2510/18; B60W 2710/18; B60W 30/12; B60W 2540/20; B60W 2554/4041; B60W 50/14; G08G 1/167; G01S 2013/932
(Continued)

(56) References Cited

U.S. PATENT DOCUMENTS

| 6,434,471 B1 | 8/2002 | Asada et al. |
| 9,002,614 B2 | 4/2015 | Tominaga et al. |

(Continued)

FOREIGN PATENT DOCUMENTS

| JP | H05-054297 A | 3/1993 |
| JP | 2001-001789 A | 1/2001 |

(Continued)

*Primary Examiner* — Rachid Bendidi
*Assistant Examiner* — Hossam M Abd El Latif
(74) *Attorney, Agent, or Firm* — Young Basile Hanlon & MacFarlane, P.C.

(57) ABSTRACT

A vehicle control method causes a controller to execute: processing of determining whether or not a first other vehicle traveling on a second lane, the second lane merging with a first lane on which an own vehicle travels in front of the own vehicle, is traveling diagonally in front of the own vehicle; and processing of, when determining that the first other vehicle is traveling diagonally in front of the own vehicle, controlling vehicle speed of the own vehicle in such a way that a front-rear direction distance from a rear-end position of the first other vehicle to a front-end position of the own vehicle in a front-rear direction of the first lane is shorter than a first target inter-vehicle distance in vehicle speed control to maintain an inter-vehicle distance to a preceding vehicle traveling in front of the own vehicle on the first lane.

7 Claims, 4 Drawing Sheets

(58) Field of Classification Search
USPC .......................................................... 701/70
See application file for complete search history.

(56) References Cited

U.S. PATENT DOCUMENTS

| | | | |
|---|---|---|---|
| 11,358,595 | B2 | 6/2022 | Horiba et al. |
| 2013/0226433 | A1 | 8/2013 | Tominaga et al. |
| 2019/0241182 | A1* | 8/2019 | Sato ........................ B60R 21/00 |
| 2019/0241198 | A1* | 8/2019 | Mori ......................... G08G 1/16 |
| 2019/0315355 | A1* | 10/2019 | Tokimasa ............... B60W 30/14 |
| 2020/0086869 | A1* | 3/2020 | Oguro .................. G05D 1/0088 |
| 2021/0009127 | A1 | 1/2021 | Horiba et al. |
| 2024/0174230 | A1* | 5/2024 | Saito ..................... B60W 30/16 |

FOREIGN PATENT DOCUMENTS

| | | |
|---|---|---|
| JP | 2013-177054 A | 9/2013 |
| JP | 2017-154614 A | 9/2017 |
| JP | 2021-014175 A | 2/2021 |

\* cited by examiner

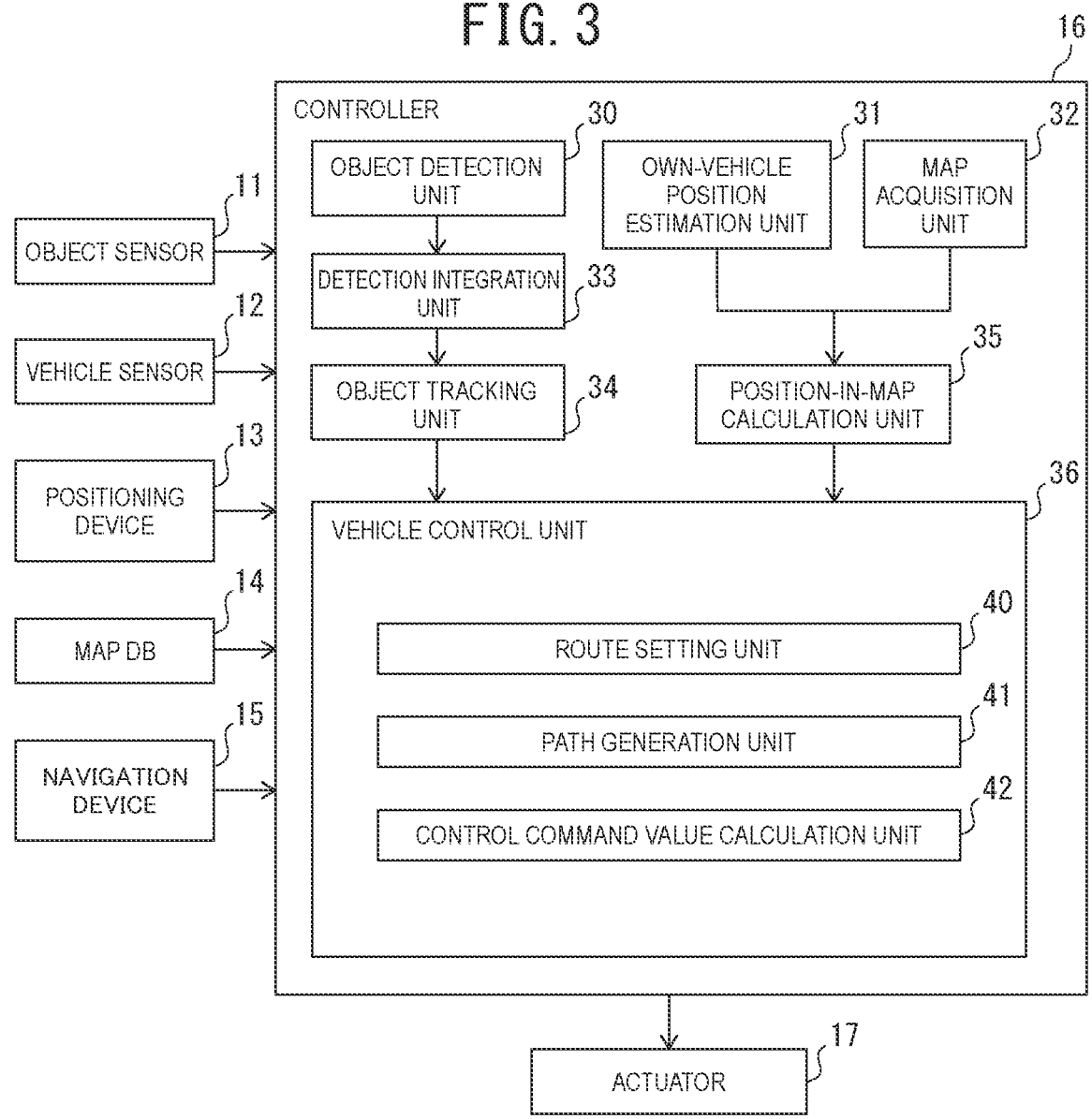

VEHICLE CONTROL METHOD AND VEHICLE CONTROL DEVICE

TECHNICAL FIELD

The present invention relates to a vehicle control method and a vehicle control device.

BACKGROUND

As a technology for controlling an inter-vehicle distance in such a way that distance to a preceding vehicle becomes constant, for example, an inter-vehicle distance control device is described in JP 2013-177054 A described below. The inter-vehicle distance control device is aimed at reducing a sense of anxiety that drivers of the own vehicle and another vehicle feel by extending an inter-vehicle distance to a preceding vehicle when another vehicle is detected on the lateral side of the own vehicle at a merging point.

SUMMARY

However, there are some cases where an interspace between a merging lane and a main lane is shielded by a wall or the like until immediately before a merging point. Thus, there are some cases where when another vehicle on another lane that merges with a lane on which the own vehicle travels is traveling diagonally in front of the own vehicle, while the another vehicle can be easily detected from the own vehicle, it is difficult to detect a following vehicle of the another vehicle. When the following vehicle and the own vehicle reach the merging point while traveling side by side without the own vehicle detecting the following vehicle, it becomes necessary for the own vehicle to rapidly decelerate or rapidly accelerate immediately after detecting the following vehicle and thereby adjust a relative ahead/behind relationship between the own vehicle and the following vehicle. The same applies to the following vehicle. As a result, there is a possibility that passengers in the own vehicle and the following vehicle are given a sense of anxiety.

An object of the present invention is to, in a merging section in which a lane on which an own vehicle travels and another lane on which another vehicle travels merge with each other in front of the own vehicle, adjust speed of the own vehicle in such a way as to reduce a sense of anxiety drivers of the own vehicle and the another vehicle feel.

According to an aspect of the present invention, there is provided a vehicle control method causing a controller to execute: processing of determining whether or not a first other vehicle traveling on a second lane, the second lane merging with a first lane on which an own vehicle travels in front of the own vehicle, is traveling diagonally in front of the own vehicle; and processing of, when determining that the first other vehicle is traveling diagonally in front of the own vehicle, controlling vehicle speed of the own vehicle in such a way that a front-rear direction distance from a rear-end position of the first other vehicle to a front-end position of the own vehicle in a front-rear direction of the first lane is shorter than a first target inter-vehicle distance in vehicle speed control to maintain an inter-vehicle distance to a preceding vehicle traveling in front of the own vehicle on the first lane.

According to an aspect of the present invention, it is possible to, in a merging section in which a lane on which an own vehicle travels and another lane on which another vehicle travels merge with each other in front of the own vehicle, adjust speed of the own vehicle in such a way as to reduce a sense of anxiety drivers of the own vehicle and the another vehicle feel.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF THE DRAWINGS

FIG. 3 is a block diagram of an example of a functional configuration of a controller in FIG. 1;

DETAILED DESCRIPTION (Configuration)

Figure 1:
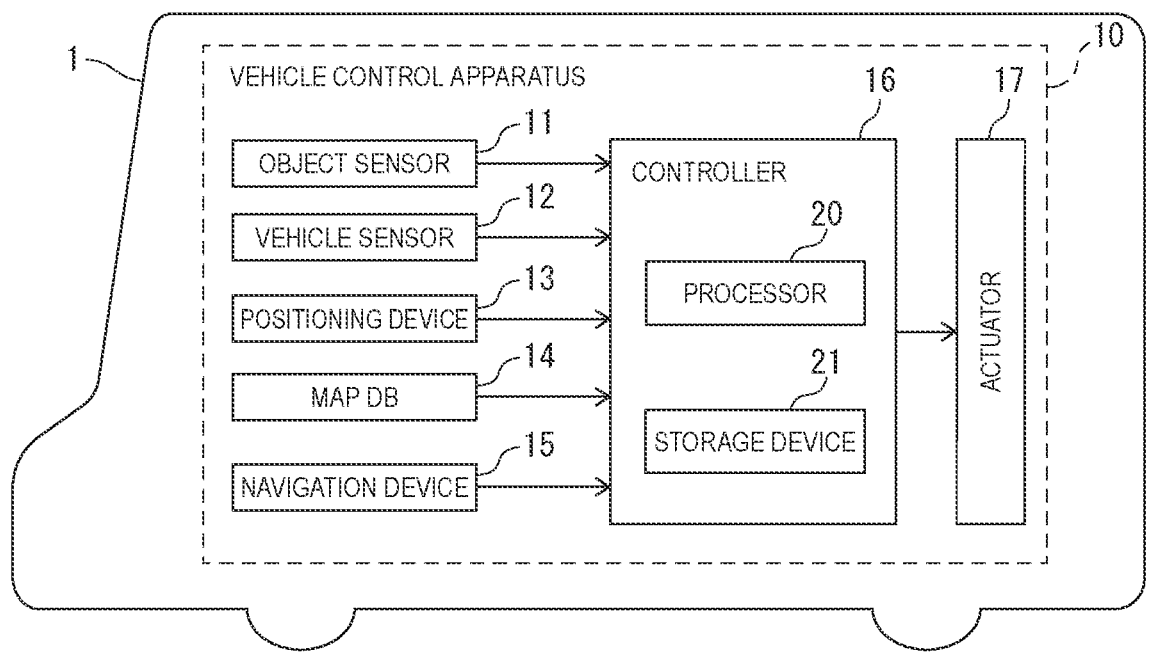
FIG. 1 is a diagram illustrative of an example of a schematic configuration of a vehicle control device of an embodiment.

FIG. 1 is a diagram illustrative of an example of a schematic configuration of a vehicle on which a vehicle control device of an embodiment is mounted. An own vehicle 1 includes a vehicle control device 10 configured to control travel of the own vehicle 1. The vehicle control device 10 detects a travel environment around the own vehicle 1 by sensors and assists travel of the own vehicle 1, based on the travel environment around the own vehicle 1. Travel assistance control of the own vehicle 1 performed by the vehicle control device 10 may include, for example, autonomous travel control causing the own vehicle 1 to autonomously travel without involvement of a driver. In addition, the travel assistance control by the vehicle control device 10 may include driving assistance control to assist the driver of the own vehicle 1 by partially controlling a steering angle, driving force, or braking force of the own vehicle 1.

The vehicle control device 10 includes object sensors 11, vehicle sensors 12, a positioning device 13, a map database 14, a navigation device 15, a controller 16, and actuators 17. In the drawings, the map database is denoted as "map DB", and a human-machine interface is denoted as "HMI".

The object sensors 11 include a plurality of object detection sensors of different types, such as a laser radar, a millimeter-wave radar, a sonar, a camera, and a light detection and ranging, laser imaging detection and ranging (LIDAR) that are mounted on the own vehicle 1, that are configured to detect objects around the own vehicle 1.

The vehicle sensors 12 are mounted on the own vehicle 1 and detect various information (vehicle signals) that can be acquired from the own vehicle 1. The vehicle sensors 12 include, for example, a vehicle speed sensor to detect traveling speed (vehicle speed) of the own vehicle 1, wheel speed sensors to detect rotational speeds of respective tires, a triaxial acceleration sensor (G sensor) to detect acceleration (including deceleration) in three axial directions, a steering angle sensor to detect a steering angle (including a steered angle), a gyro sensor to detect angular velocity generated in the own vehicle 1, a yaw rate sensor to detect a yaw rate, an accelerator sensor to detect accelerator opening of the own vehicle, and a brake sensor to detect a brake operation amount by the driver.

The positioning device 13 includes a global navigation satellite system (GNSS) receiver and, by receiving radio waves from a plurality of navigation satellites, measures a current position of the own vehicle 1. The GNSS receiver may be, for example, a global positioning system (GPS) receiver or the like. The positioning device 13 may be, for example, an inertial navigation device.

The map database 14 may store high-definition map data (hereinafter, simply referred to as "high-definition map") that are suitable as a map for self-driving. The high-definition map is map data of higher definition than map data for navigation (hereinafter, simply referred to as "navigation map") and includes lane-by-lane information, which is more detailed than road-by-road information. For example, the high-definition map includes, as lane-by-lane information, information of lane nodes that indicate reference points on a lane reference line (for example, a line at the center of a lane) and information of lane links that indicate forms of lane sections between lane nodes. Information of each lane node includes an identification number and position coordinates of the lane node, the number of connected lane links, and identification numbers of connected lane links. Information of each lane link includes an identification number of the lane link, a type of the lane, width of the lane, types of lane boundary lines, a shape of the lane, a shape of a lane marking, and a shape of a lane reference line. The high-definition map further includes the types and position coordinates of ground objects, such as a traffic light, a stop line, a road sign, a building, a utility pole, a curb, and a crosswalk, that exist on a lane or in the vicinity of the lane and information of the ground objects, such as identification numbers of lane nodes and identification numbers of lane links that correspond to the position coordinates of the ground objects.

The navigation device 15 recognizes a current position of the own vehicle, using the positioning device 13 and acquires map information at the current position from the map database 14. The navigation device 15 sets a road-based route (hereinafter, sometimes referred to as "navigation route") to a destination that a passenger inputs and performs route guidance for the passenger in accordance with the navigation route. The navigation device 15 also outputs information about the navigation route to the controller 16. When performing autonomous travel control, the controller 16 may autonomously drive the own vehicle in such a way that the own vehicle travels along the navigation route.

The controller 16 is an electronic control unit (ECU) that controls travel of the own vehicle 1. The controller 16 includes a processor 20 and peripheral components, such as a storage device 21. The processor 20 may be, for example, a central processing unit (CPU) or a micro-processing unit (MPU). The storage device 21 may include a semiconductor storage device, a magnetic storage device, an optical storage device, and the like. The storage device 21 may include registers, a cache memory, and a memory, such as a read only memory (ROM) and a random access memory (RAM), that is used as a main storage device. Functions of the controller 16, which will be described below, may be achieved by, for example, the processor 20 executing computer programs stored in the storage device 21. The controller 16 may be formed by dedicated hardware (for example, a programmable logic device, such as a field-programmable gate array (FPGA)) for executing respective types of information processing that will be described below.

The actuators 17 operate a steering wheel, accelerator opening, and a braking device of the own vehicle 1 in accordance with control signals output from the controller 16 and thereby generate vehicle behavior of the own vehicle. The actuators 17 include a steering actuator, an accelerator opening actuator, and brake control actuators. The steering actuator controls steering direction and the amount of steering of the own vehicle 1. The accelerator opening actuator controls the accelerator opening of the own vehicle 1. The brake control actuators control braking action of the braking devices of the own vehicle 1.

Figure 2A:
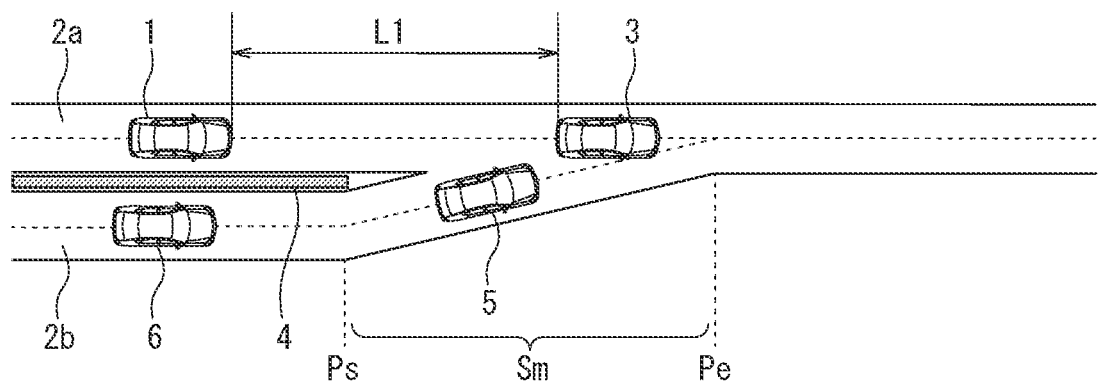
FIG. 2A is an explanatory diagram of a problem in conventional inter-vehicle distance control.

Next, an example of control of the own vehicle 1 performed by the controller 16 will be described. FIG. 2A is an explanatory diagram of a problem in conventional inter-vehicle distance control.

A situation in which the own vehicle 1 is traveling on a first lane 2a and a second lane 2b merges with the first lane 2a in a merging section Sm in front of the own vehicle 1 is now assumed. For example, the first lane 2a and the second lane 2b may serve as a main lane and a merging lane, respectively, or the second lane 2b and the first lane 2a may serve as a main lane and a merging lane, respectively. Positions Ps and Pe are a start point and an end point of the merging section Sm, respectively.

The own vehicle 1 is performing inter-vehicle distance control in which a preceding vehicle 3 that travels in front of the own vehicle 1 on the first lane 2a is set as a target to be followed. That is, the own vehicle 1 is performing vehicle speed control to maintain an inter-vehicle distance to the preceding vehicle 3 at a target inter-vehicle distance.

In the following description, a vehicle that serves as a target to be followed in the inter-vehicle distance control is sometimes referred to as "target vehicle".

In the inter-vehicle distance control, vehicle speed V of the own vehicle 1 is controlled in such a way that an inter-vehicle distance between the preceding vehicle 3 and the own vehicle 1 coincides with a target inter-vehicle distance L1 and the own vehicle 1 travels at a speed less than or equal to a preset set speed. The target inter-vehicle distance L1 is set to a value that is defined in advance as a standard inter-vehicle distance. When vehicle speed of the own vehicle is denoted by V and a standard time headway is denoted by N, the target inter-vehicle distance L1 may, for example, be set by the formula (1) below.

$$L1 = V \times N \tag{1}$$

The standard time headway N is, for example, 1.0 to 2.0 seconds, and more preferably 1.5 to 1.8 seconds.

The first lane 2a and the second lane 2b are shielded from each other by a wall 4 or the like. Thus, when a first other vehicle 5 on the second lane 2b travels diagonally in front of the own vehicle 1, it is easy to detect the first other vehicle 5 from the own vehicle 1 even before an interspace between the merging lane and the main lane reaches a merging point. However, it is difficult to detect a following vehicle 6 of the first other vehicle 5 from the own vehicle 1 because of the wall 4.

Thus, the own vehicle 1 and the following vehicle 6 are brought into a state of traveling side by side, as illustrated in FIG. 2A, and when the own vehicle 1 and the following vehicle 6 reach the merging point without performing anything, it becomes necessary for the own vehicle 1 to rapidly decelerate or rapidly accelerate immediately after detecting the following vehicle 6 and thereby adjust a relative ahead/behind relationship between the own vehicle 1 and the following vehicle 6. The same applies to the following vehicle 6. As a result, there is a possibility that passengers in the own vehicle 1 and the following vehicle 6 are given a sense of anxiety.

Figure 2B:
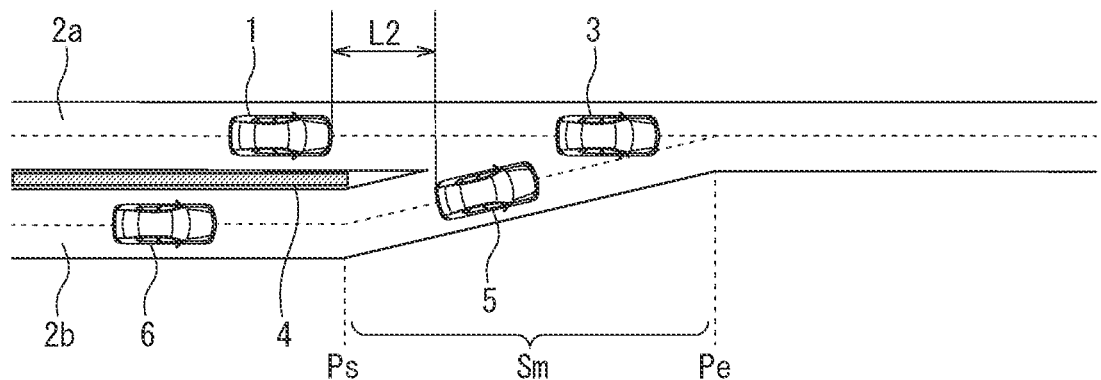
FIG. 2B is an explanatory diagram of an example of a vehicle control method of the embodiment.

FIG. 2B is an explanatory diagram of an example of a vehicle control method of the embodiment. In the vehicle control method of the embodiment, the controller 16 determines whether or not the first other vehicle 5 that travels on the second lane 2b, which merges with the first lane 2a on which the own vehicle 1 travels, in front of the own vehicle 1 is traveling diagonally in front of the own vehicle 1.

When determining that the first other vehicle 5 is traveling diagonally in front of the own vehicle 1, the controller 16 controls vehicle speed of the own vehicle 1 in such a way that an inter-vehicle distance between the own vehicle 1 and the first other vehicle 5 is shorter than a first target inter-vehicle distance L1 in the vehicle speed control to maintain the inter-vehicle distance to the preceding vehicle 3.

In this configuration, an inter-vehicle distance between the own vehicle 1, which travels on the first lane 2a, and the first other vehicle 5, which travels on the second lane 2b, is defined as, for example, a front-rear direction distance from a rear-end position of the first other vehicle 5 to a front-end position of the own vehicle 1 in the front-rear direction of the first lane 2a (or the second lane 2b).

For example, in order to make the inter-vehicle distance between the own vehicle 1 and the first other vehicle 5 shorter than the first target inter-vehicle distance L1, the controller 16 may set a second target inter-vehicle distance L2 that is shorter than the first target inter-vehicle distance L1 as a target value of the inter-vehicle distance between the own vehicle 1 and the first other vehicle 5 and control the vehicle speed of the own vehicle 1 in such a way that the inter-vehicle distance between the own vehicle 1 and the first other vehicle 5 coincides with the second target inter-vehicle distance L2.

As described above, performing the inter-vehicle distance control in such a way that the inter-vehicle distance to the first other vehicle 5 that travels on the second lane 2b becomes comparatively short enables the own vehicle 1 to be easily positioned ahead of the following vehicle 6 at a time point at which the own vehicle 1 that has reached a vicinity of the merging point detects the following vehicle 6 of the first other vehicle 5. As a result, when the following vehicle 6 reaches the merging point, the following vehicle 6 can easily enter a space behind the own vehicle 1. Thus, since it becomes unnecessary to provide a space for the following vehicle 6 to, by rapidly decelerating or rapidly accelerating, enter the first lane 2a, a sense of anxiety that drivers of the own vehicle and other vehicles feel can be reduced.

Functions of the controller 16 will be described in detail below. FIG. 3 is a block diagram illustrative of an example of a functional configuration of the controller 16. The controller 16 includes an object detection unit 30, an own-vehicle position estimation unit 31, a map acquisition unit 32, a detection integration unit 33, an object tracking unit 34, a position-in-map calculation unit 35, and a vehicle control unit 36.

The object detection unit 30 detects, based on detection signals from the object sensors 11, positions, attitudes, sizes, speeds, and the like of objects around the own vehicle 1, such as a vehicle (a car or a motorcycle), a pedestrian, and an obstacle. The object detection unit 30 outputs detection results representing two-dimensional positions, attitudes, sizes, speeds, and the like of objects in, for example, a zenith view (also referred to as a plan view) in which the own vehicle 1 is viewed from the sky.

The own-vehicle position estimation unit 31 measures an absolute position of the own vehicle 1, that is, a position, an attitude, and speed of the own vehicle 1 with respect to a predetermined reference point, based on a measurement result by the positioning device 13 and odometry using detection results from the vehicle sensors 12. The map acquisition unit 32 acquires map information that indicates a structure of a road on which the own vehicle 1 travels, from the map database 14. The map acquisition unit 32 may acquire map information from an external map data server through a communication device.

The detection integration unit 33 integrates a plurality of detection results that the object detection unit 30 has respectively acquired from a plurality of object detection sensors and outputs a single set of a two-dimensional position, an attitude, size, speed, and the like with respect to each object. Specifically, the detection integration unit 33 calculates, from behaviors of objects respectively acquired from the object detection sensors, the most reasonable behaviors of the objects that minimize error, in consideration of error characteristics of the respective object detection sensors. Specifically, by using a known sensor fusion technology, the detection integration unit 33 comprehensively evaluates detection results acquired by a plurality of types of sensors and acquires a more accurate detection result.

The object tracking unit 34 tracks objects detected by the object detection unit 30. Specifically, based on the detection results integrated by the detection integration unit 33, the object tracking unit 34 performs verification of identity (association) of objects between different times from behaviors of the objects output at different times and predicts, based on the association, behaviors of the objects, such as speed.

The position-in-map calculation unit 35 estimates a position and an attitude of the own vehicle 1 on the map from the absolute position of the own vehicle 1, which is acquired by the own-vehicle position estimation unit 31, and the map information, which is acquired by the map acquisition unit 32. In addition, the position-in-map calculation unit 35 identifies a road on which the own vehicle 1 is traveling, further identifies the first lane 2a on which the own vehicle 1 travels within the identified road, and calculates a lateral direction position (a vehicle width direction position or a lateral position in the lane) of the own vehicle 1 in the first lane 2a.

The vehicle control unit 36 controls travel of the own vehicle 1 by driving the actuators 17, based on prediction results of behaviors of objects predicted by the object tracking unit 34, a calculation result of a position and attitude of the own vehicle 1 calculated by the position-in-map calculation unit 35, and an input by a passenger (for example, the driver). The vehicle control unit 36 includes a route setting unit 40, a path generation unit 41, and a control command value calculation unit 42.

The route setting unit 40 sets a lane-based target route (hereinafter, simply referred to as "route") on which the own vehicle 1 is to travel, based on a current position of the own vehicle 1 calculated by the position-in-map calculation unit 35 and a destination input by the passenger (or based on a navigation route set by the navigation device 15). The route is a target route that is statically set and is set based on a lane shape in the high-definition map stored in the map database 14 and a shape of a lane boundary line detected by the object sensors 11. For example, a lane center of a road on which the own vehicle 1 travels when the own vehicle 1 moves from the current position to the destination may be set as the route.

The path generation unit 41 determines whether or not the own vehicle 1 performs a driving action, such as a lane change, and based on a determination result, sets a target path (hereinafter, simply referred to as "path") that the own vehicle 1 is to travel. The path is dynamically set according to driving action of the own vehicle 1, and when, for example, the own vehicle 1 is caused to make a lane change according to traffic conditions, the path generation unit 41 generates a movement route on which the own vehicle 1 moves from a lane before the lane change to a lane after the lane change, based on a vehicle model of the own vehicle 1. On the contrary, when the own vehicle 1 is not caused to make a lane change, the path generation unit 41 generates a path that coincides with the route.

The control command value calculation unit 42 calculates a control command value (a steering command value and a vehicle speed command value) that causes the own vehicle 1 to move along the path P generated by the path generation unit 41 while keeping a space to objects around the own vehicle 1. The control command value calculation unit 42 calculates a vehicle speed command value of the own vehicle 1, based on distance to a preceding vehicle, relative speed with respect to the preceding vehicle, and relative acceleration. The command value calculation unit 42 calculates a target travel trajectory of the own vehicle 1 by calculating a target position, an attitude, speed, and curvature of the own vehicle at each time t+i×dt (i is an integer of 1 to N) for N steps from the current time t to t+N×dt seconds later, based on the vehicle speed command value and the path P.

The control command value calculation unit 42 calculates an acceleration/deceleration and a turning angle command value in such a way that the own vehicle 1, while keeping a distance to an object around the own vehicle 1, comes as close as possible to the target travel trajectory. Such control can be achieved by a general obstacle avoidance algorithm, such as optimal control using a potential function depending on distance to an obstacle. However, a margin to an obstacle that is set in the obstacle avoidance control is a limit value that is set in such a manner that a vehicle does not come too close to the obstacle and is often narrower than a distance that a general passenger feels appropriate.

Thus, when generating a target travel trajectory, the control command value calculation unit 42 calculates a vehicle speed command value in such a manner that distance to a target vehicle serving as a target to be followed in the inter-vehicle distance control is kept wide. Because of this configuration, a final vehicle speed command value and steering command value are controlled in such a way that the own vehicle 1 does not come too close to a preceding vehicle.

The inter-vehicle distance control that is executed by the control command value calculation unit 42 will be described. First, the control command value calculation unit 42 identifies a target vehicle serving as a target to be followed in the inter-vehicle distance control. The control command value calculation unit 42 predicts, based on a motion state, such as a position, speed, and acceleration, of another vehicle estimated by the object tracking unit 34, a position of the another vehicle a predetermined prediction time duration T seconds later. For example, the control command value calculation unit 42 calculates a movement amount D for T seconds, based on speed and acceleration and calculates a position to which the another vehicle advances by the movement amount D along the lane from the current position of the another vehicle as a predicted position of the another vehicle.

Figure 4A:
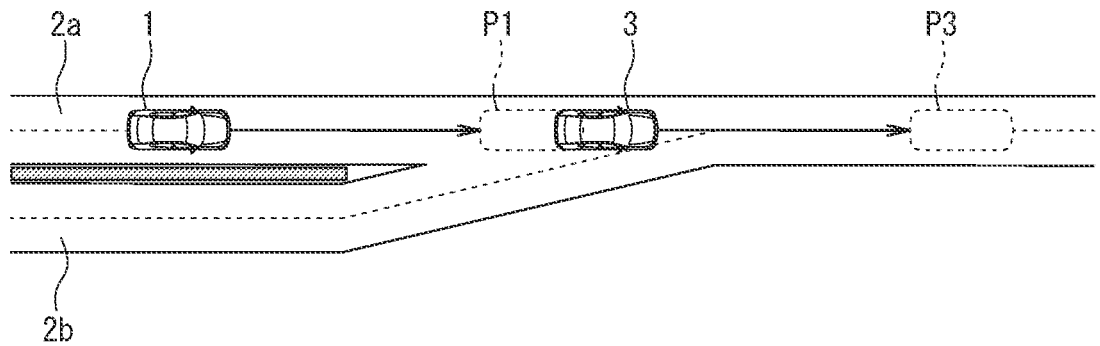
FIG. 4A is a diagram illustrative of an example of a target vehicle serving as a target to be followed in inter-vehicle distance control.

P3 in FIG. 4A illustrates an example of a predicted position of a second other vehicle 3 that travels in front of the own vehicle 1 on the first lane 2a. P1 in FIGS. 4A to 4C illustrates a predicted position of the own vehicle 1 T seconds later.

Figure 4B:
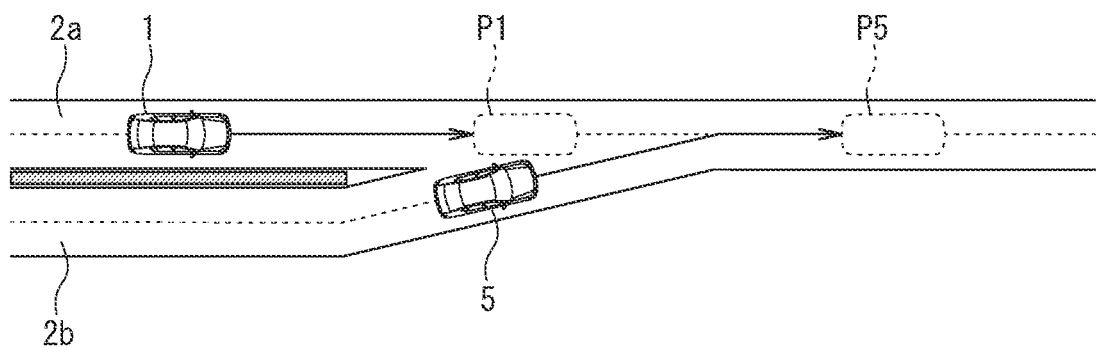
FIG. 4B is a diagram illustrative of another example of the target vehicle serving as a target to be followed in the inter-vehicle distance control.

P5 in FIG. 4B illustrates an example of a predicted position of the first other vehicle 5 that travels diagonally in front of the own vehicle 2 on the second lane 2b.

Figure 4C:
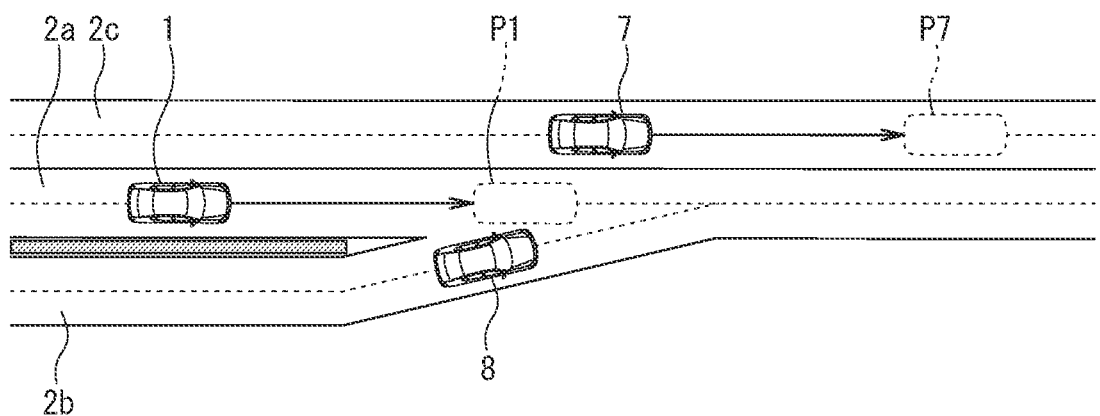
FIG. 4C is a diagram illustrative of a vehicle that does not serve as a target to be followed in inter-vehicle distance control.

P7 in FIG. 4C illustrates an example of a predicted position of a third other vehicle 7, the third other vehicle 7 traveling on an adjacent lane 2c of the first lane 2a, T seconds later. A fourth other vehicle 8 in FIG. 4C stands on the second lane 2b, and a movement amount of the fourth other vehicle 8 from the current time to T seconds later is 0.

The control command value calculation unit 42 determines whether or not the other vehicles 3, 5, 7, and 8 are set as targets to be followed in the inter-vehicle distance control (that is, determines whether or not the other vehicles 3, 5, 7, and 8 are target vehicles), based on the predicted positions of the other vehicles 3, 5, 7, and 8. Specifically, when a predicted position of another vehicle T seconds later is located on a travel route of the own vehicle 1 in the case where the own vehicle 1 travels forward from the predicted position P1 of the own vehicle 1 along the first lane 2a, the control command value calculation unit 42 identifies the another vehicle as a target vehicle. When no predicted position of another vehicle T seconds later is located on the travel route of the own vehicle 1, the control command value calculation unit 42 determines that the another vehicle is not a target vehicle.

In the example in FIG. 4A, the predicted position P3 of the second other vehicle 3 is located on the travel route of the own vehicle 1. Thus, the control command value calculation unit 42 determines that the second other vehicle 3 is a target vehicle. The control command value calculation unit 42 may determine a preceding vehicle on the first lane 2a on which the own vehicle 1 travels as a target.

In the example in FIG. 4B, the predicted position P5 of the first other vehicle 5 is located on the travel route of the own vehicle 1. Thus, the control command value calculation unit 42 determines that the first other vehicle 5 is a target vehicle. Note that the control command value calculation unit 42 may compare distance d1 from the own vehicle 1 to the merging point between the first lane 2a and the second lane 2b with distance d2 from the first other vehicle 5 traveling on the second lane 2b to the merging point and when the distance d2 is shorter than the distance d1, determine that the first other vehicle 5 is a target vehicle.

In the example in FIG. 4C, the predicted position P7 of the third other vehicle 7 is not located on the travel route of the own vehicle 1. Since the fourth other vehicle 8 does not move, the predicted position of the fourth other vehicle 8 T seconds later is also not located on the travel route of the own vehicle 1. Thus, the control command value calculation unit 42 determines that the third other vehicle 7 and the fourth other vehicle 8 are not a target vehicle.

Because of this configuration, not only the second other vehicle 3 traveling on the first lane 2a on which the own vehicle 1 travels but also the first other vehicle 5 traveling on the second lane 2b that merges with the first lane 2a can be set as a target to be followed in the inter-vehicle distance control. Further, excluding a vehicle yielding a path to the own vehicle 1, such as the fourth other vehicle 8 standing on the merging lane as illustrated in FIG. 4C, from targets to be followed enables unnecessary deceleration to be avoided.

The prediction time duration T is time length to calculate whether or not a neighboring vehicle merges with the travel route of the own vehicle 1 in the future and is preferably set to approximately 10 seconds to 20 seconds. For example, when it is assumed that T=10 seconds, only a vehicle that has a possibility to merge with the travel route of the own vehicle 1 within 10 seconds is extracted. When T is too short, a response to a merging target vehicle (for example, the first other vehicle 5) is delayed and rapid acceleration and deceleration become necessary. In contrast, when T is too long, since the inter-vehicle distance control is started for a merging target vehicle even when the target vehicle has a long distance to travel before reaching the merging point, there is a possibility that a passenger is given a sense of discomfort.

Next, the control command value calculation unit 42 determines whether or not another vehicle determined to be a target vehicle (in the examples in FIGS. 4A to 4C, the first other vehicle 5 and the second other vehicle 3) is another vehicle on a lane that merges with the first lane 2a on which the own vehicle 1 travels. For example, when the current positions of the first other vehicle 5 and the second other vehicle 3 are located on the same lane as the lane on which the current position of the own vehicle 1 is located, the control command value calculation unit 42 determines that the first other vehicle 5 and the second other vehicle 3 are not another vehicle on a lane merging with the first lane 2a, and when the current positions of the first other vehicle 5 and the second other vehicle 3 are not located on the same lane, the control command value calculation unit 42 determines that the first other vehicle 5 and the second other vehicle 3 are another vehicle on a lane merging with the first lane 2a. In the examples in FIGS. 4A to 4C, the control command value calculation unit 42 determines the first other vehicle 5 to be another vehicle on a lane merging with the first lane 2a and determines the second other vehicle 3 not to be another vehicle on a lane merging with the first lane 2a.

The control command value calculation unit 42 sets a target inter-vehicle distance in the inter-vehicle distance control in which a vehicle other than another vehicle on a lane merging with the first lane 2a (in the examples in FIGS. 4A to 4C, the second other vehicle 3 on the first lane 2a) is set as a target to be followed to the first target inter-vehicle distance L1 that is a standard (general) inter-vehicle distance. The first target inter-vehicle distance L1 is an inter-vehicle distance of an appropriate magnitude that does not give a passenger (for example, the driver) a sense of anxiety and may be set to a length proportional to the vehicle speed. For example, the first target inter-vehicle distance L1 may be set by the formula (1) above.

The control command value calculation unit 42 sets a target inter-vehicle distance in the inter-vehicle distance control in which another vehicle on a lane merging with the first lane 2a (in the examples in FIGS. 4A to 4C, the first other vehicle 5 on the second lane 2b) is set as a target to be followed to a second target inter-vehicle distance L2 that is shorter than the first target inter-vehicle distance L1. Setting the inter-vehicle distance to another vehicle on a lane merging with the first lane 2a to the second target inter-vehicle distance L2, which is shorter than the first target inter-vehicle distance L1, enables a state in which the own vehicle 1 is located in front of the following vehicle 6 that has not been detected as illustrated in FIG. 2B to be easily established.

For example, the second target inter-vehicle distance L2 may be set to a value within a range of an inter-vehicle distance lower limit Lmin, which will be described by an example below, or more and an inter-vehicle distance upper limit Lmax, which will be described by an example below, or less The inter-vehicle distance lower limit Lmin is a shortest inter-vehicle distance at which the own vehicle can follow deceleration of a preceding vehicle and is, for example, a distance that is approximately the same as a margin to an obstacle that is set in the aforementioned obstacle avoidance control. The inter-vehicle distance lower limit Lmin is designed in consideration of motion performance and a safety ratio of the own vehicle 1.

When the second target inter-vehicle distance L2 is shorter than the inter-vehicle distance lower limit Lmin, since when the first other vehicle 5 enters the first lane 2a, distance between the own vehicle 1 and the first other vehicle 5 becomes small, an avoidance movement is required to be performed. Such an avoidance movement generally has a possibility to cause passengers in the own vehicle 1 and other vehicles around the own vehicle 1 to be given a sense of anxiety.

The inter-vehicle distance upper limit Lmax is a value that is set to prevent a situation in which the following vehicle 6 of the first other vehicle 5 and the own vehicle I reach the merging point while traveling side by side. Ideally, the second target inter-vehicle distance L2 between the own vehicle 1 and the first other vehicle 5 is preferably approximately half of the inter-vehicle distance between the first other vehicle 5 and the following vehicle 6. However, when the first lane 2a and the second lane 2b are shielded from each other by a wall or the like, the own vehicle I cannot detect the following vehicle 6 until the own vehicle I reaches a vicinity of the merging point. Thus, it is assumed that the inter-vehicle distance between the first other vehicle 5 and the following vehicle 6 is a standard inter-vehicle distance.

Since the standard inter-vehicle distance can be approximated by vehicle speed multiplied by standard time headway N, the inter-vehicle distance upper limit Lmax may be set by, for example, the formula (2) below.

$$Lmax = V_i \times N \times 0.5 \qquad (2)$$

Note that in the formula (2), $V_i$ is vehicle speed of the first other vehicle 5.

To predict the inter-vehicle distance between the first other vehicle 5 and the following vehicle 6, the vehicle speed of the first other vehicle 5 is preferably used instead of the vehicle speed of the own vehicle 1. For example, when the first other vehicle 5 on the second lane 2b travels at a lower speed than vehicle speeds of vehicles on the first lane 2a, there is a risk that the following vehicle 6 has come close to the first other vehicle 5. Determining the second target inter-vehicle distance L2, based on the vehicle speed $V_i$ of the first other vehicle 5 enables the own vehicle 1 to be easily positioned in front of the following vehicle 6 even when the first other vehicle 5 travels slow.

The control command value calculation unit 42 performs inter-vehicle distance control, using a target inter-vehicle distance that is set with respect to a target vehicle as described above. For example, the control command value calculation unit 42 may calculate a vehicle speed command value V of the own vehicle in such a way that an inter-vehicle distance between each of all the identified target vehicles and the own vehicle 1 is greater than or equal to a target inter-vehicle distance that is set with respect to the target vehicle. Specifically, the control command value calculation unit 42 may define an evaluation function F expressed by the formula (3) below and calculate a vehicle speed command value V that minimizes the evaluation function F by optimization calculation.

[Math 1]
$$F = \sum_i \left[ W_L * \{\max(0, Lr_i - L_i - (V_i - V) \cdot dt)\}^2 \right] + W_V * (Vr - V)^2 \quad (3)$$

In the formula (3), $Lr_i$ denotes a target inter-vehicle distance set with respect to a target vehicle i, $L_i$ denotes a current inter-vehicle distance between the target vehicle i and the own vehicle 1, $V_i$ denotes speed of the target vehicle i, Vr denotes set vehicle speed, $W_L$ denotes weight of an inter-vehicle distance, and Wv denotes weight of the set vehicle speed.

The first term of the evaluation function F increases when the inter-vehicle distance to the target vehicle i is shorter than the target inter-vehicle distance Lni and is 0 when the inter-vehicle distance to the target vehicle i is longer than the target inter-vehicle distance $Lr_i$. Summing costs calculated with respect to all the target vehicles i causes optimization to be performed in such a way that an inter-vehicle distance to each of all the target vehicles i is greater than or equal to the target inter-vehicle distance $Lr_i$ of the target vehicle i.

For example, in the examples in FIGS. 2A and 2B, the evaluation function F includes the sum of a cost that increases as the inter-vehicle distance between the first other vehicle 5 and the own vehicle 1 becomes shorter than the second target inter-vehicle distance L2 and a cost that increases as the inter-vehicle distance between the second other vehicle 3 and the own vehicle 1 becomes shorter than the first target inter-vehicle distance L1.

The larger a difference between the vehicle speed of the own vehicle 1 and the set vehicle speed Vr is, the larger the second term of the evaluation function F becomes. Because of this configuration, when the inter-vehicle distance between a target vehicle i and the own vehicle 1 is sufficiently large, the own vehicle 1 accelerates or decelerates in such a way that the vehicle speed V comes close to the set vehicle speed Vr.

Note that after the first other vehicle 5 makes a lane change from the second lane 2b to the first lane 2a in front of the own vehicle 1, the control command value calculation unit 42 may maintain the target inter-vehicle distance with respect to the first other vehicle 5 (that is, the target inter-vehicle distance in the inter-vehicle distance control in which the first other vehicle is set as a target to be followed) at the second target inter-vehicle distance L2 for some time. Because of this configuration, it is possible to prevent the following vehicle 6 of the first other vehicle 5 from making a lane change to the front of the own vehicle 1, following the first other vehicle 5.

For example, until after the first other vehicle 5 makes a lane change in front of the own vehicle 1, a predetermined time elapses, the own vehicle 1 travels a predetermined distance, or the own vehicle 1 passes the end point Pe of the merging section Sm, the target inter-vehicle distance with respect to the first other vehicle 5 may be maintained at the second target inter-vehicle distance L2. Subsequently, after the predetermined time elapses, the own vehicle I travels a predetermined distance, or the own vehicle 1 passes the end point Pe of the merging section Sm, the target inter-vehicle distance with respect to the first other vehicle 5 is changed from the second target inter-vehicle distance L2 to the first target inter-vehicle distance L1.

In addition, for example, the control command value calculation unit 42 may limit deceleration in the case of extending the inter-vehicle distance between the own vehicle 1 and the first other vehicle 5 to the second target inter-vehicle distance L2 from a state in which the inter-vehicle distance between the own vehicle 1 and the first other vehicle 5 is shorter than the second target inter-vehicle distance L2. For example, the control command value calculation unit 42 may limit the deceleration in such a way that the deceleration becomes smaller than an upper limit of deceleration that is allowable when the inter-vehicle distance control in which the preceding vehicle 3 on the first lane 2a is set as a target to be followed is performed.

In addition, for example, the control command value calculation unit 42 may set an upper limit of the absolute value of a change rate of the vehicle speed in the case of reducing the inter-vehicle distance between the own vehicle 1 and the first other vehicle 5 to the second target inter-vehicle distance L2 from a state in which the inter-vehicle distance between the own vehicle 1 and the first other vehicle 5 is longer than the second target inter-vehicle distance L2 to a value larger than an upper limit of the absolute value of a change rate of the vehicle speed in the case of extending the inter-vehicle distance between the own vehicle 1 and the first other vehicle 5 to the second target inter-vehicle distance L2 from a state in which the inter-vehicle distance between the own vehicle 1 and the first other vehicle 5 is shorter than the second target inter-vehicle distance L2.

Setting acceleration and deceleration when the inter-vehicle distance between the own vehicle 1 and the first other vehicle 5 is adjusted to the second target inter-vehicle distance as described above enables the inter-vehicle distance between the own vehicle 1 and the first other vehicle 5 to be easily reduced. Thus, when the own vehicle 1 reaches the merging point, the own vehicle 1 can be easily positioned ahead of the following vehicle 6 of the first other vehicle 5.

In addition, responsiveness in starting control to reduce the inter-vehicle distance between the own vehicle 1 and the first other vehicle 5 to the second target inter-vehicle distance L2 after a state in which the inter-vehicle distance between the own vehicle 1 and the first other vehicle 5 is longer than the second target inter-vehicle distance L2 is detected may be set high, and responsiveness in starting control to extend the inter-vehicle distance between the own vehicle 1 and the first other vehicle 5 to the second target inter-vehicle distance L2 after a state in which the inter-vehicle distance between the own vehicle 1 and the first other vehicle 5 is shorter than the second target inter-vehicle distance L2 is detected may be set low.

For example, the responsiveness in starting control to reduce the inter-vehicle distance between the own vehicle 1 and the first other vehicle 5 to the second target inter-vehicle distance L2 may be set higher than the responsiveness in starting control to extend the inter-vehicle distance between the own vehicle 1 and the first other vehicle 5 to the second target inter-vehicle distance L2.

Setting the responsiveness in starting control to adjust the inter-vehicle distance between the own vehicle 1 and the first other vehicle 5 to the second target inter-vehicle distance as described above enables the inter-vehicle distance between the own vehicle 1 and the first other vehicle 5 to be easily reduced. Thus, when the own vehicle I reaches the merging point, the own vehicle 1 can be easily positioned ahead of the following vehicle 6 of the first other vehicle 5.

(Operation)

Figure 5:
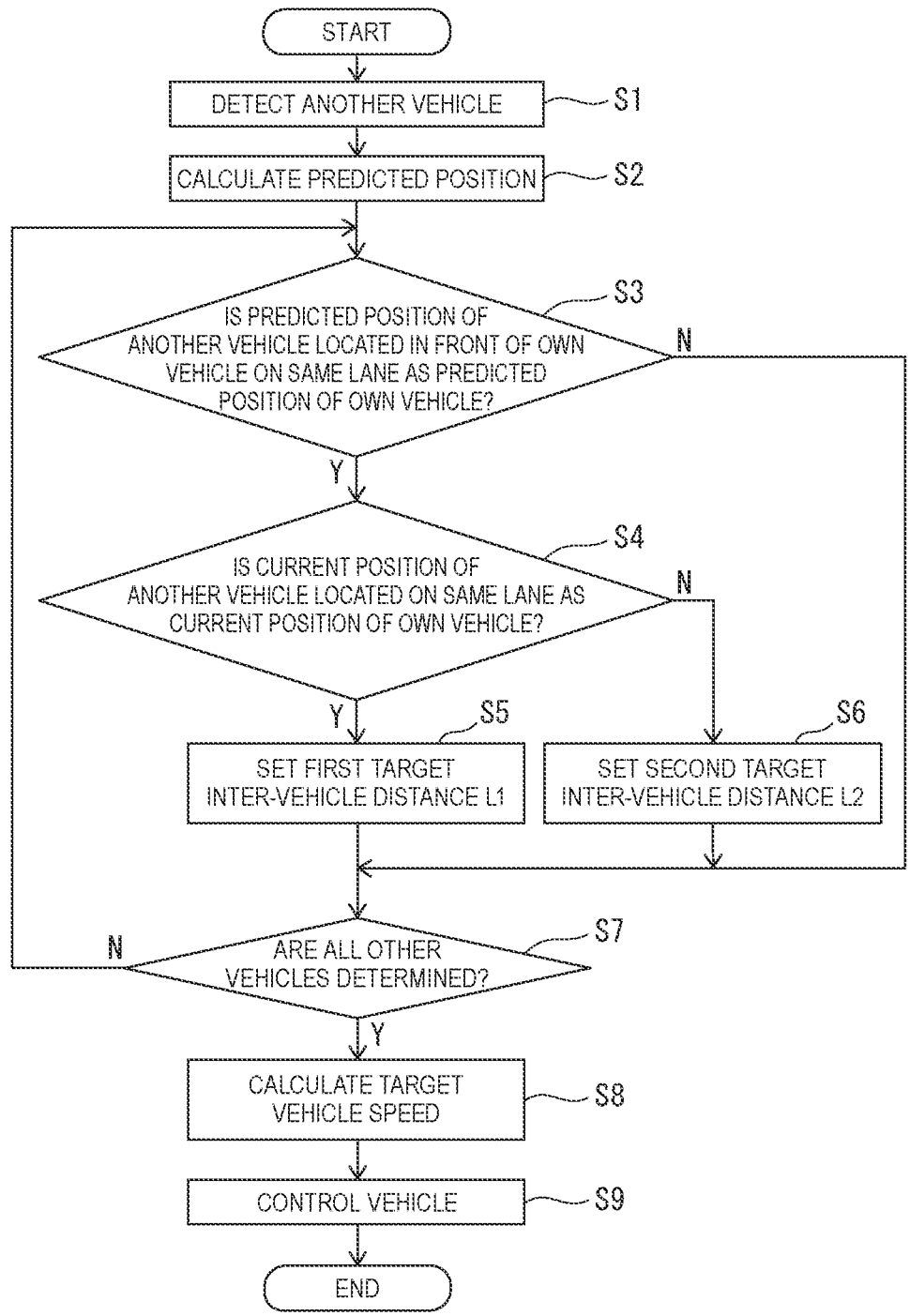
FIG. 5 is a flowchart of an example of a vehicle control method of the embodiment.

FIG. 5 is a flowchart of an example of a vehicle control method of the embodiment.

In step S1, the object tracking unit 34 detects a motion state, such as a position, speed, and acceleration, of another vehicle around the own vehicle 1.

In step S2, the control command value calculation unit 42 calculates a predicted position of the another vehicle prediction time duration T later.

In steps S3 to S7, the control command value calculation unit 42 selects each of other vehicles detected by the object tracking unit 34 one by one, determines whether or not the selected other vehicle (hereinafter, referred to as "marked vehicle") is a target vehicle that serves as a target to be followed in the inter-vehicle distance control, and sets a target inter-vehicle distance with respect to the target vehicle.

In step S3, the control command value calculation unit 42 determines whether or not a predicted position of the marked vehicle is located in front of the own vehicle 1 on the same lane as a lane on which a predicted position of the own vehicle 1 T seconds later is located. When the predicted position of the marked vehicle is located in front of the own vehicle I on the same lane as the lane on which the predicted position of the own vehicle 1 is located (S3: Y), the control command value calculation unit 42 determines that the marked vehicle is a target vehicle and the process proceeds to step S4. When the predicted position of the marked vehicle is not located in front of the own vehicle 1 on the same lane as the lane on which the predicted position of the own vehicle 1 is located (S3: N), the control command value calculation unit 42 determines that the marked vehicle is not a target vehicle and the process proceeds to step S7.

In step S4, the control command value calculation unit 42 determines whether or not a current position of the marked vehicle is located on the same lane as the lane on which a current position of the own vehicle 1 is located. When the current position of the marked vehicle is located on the same lane as the lane on which the current position of the own vehicle 1 is located (S4: Y), the process proceeds to step S5. When the current position of the marked vehicle is not located on the same lane as the lane on which the current position of the own vehicle 1 is located (S4: N), the process proceeds to step S6.

In step S5, the control command value calculation unit 42 sets the target inter-vehicle distance with respect to the marked vehicle to the first target inter-vehicle distance L1. Subsequently, the process proceeds to step S7.

In step S6, the control command value calculation unit 42 sets the target inter-vehicle distance with respect to the marked vehicle to the second target inter-vehicle distance L2. Subsequently, the process proceeds to step S7.

In step S7, the control command value calculation unit 42 determines whether or not all the other vehicles detected by the object tracking unit 34 have been determined in step S3. When all the other vehicles have been determined (S7: Y), the process proceeds to step S8. When another vehicle that has not been determined remains (S7: N), the control command value calculation unit 42 selects one of such other vehicles that have not been determined and the process returns to step S3.

In step S8, the control command value calculation unit 42 calculates a vehicle speed command value of the own vehicle 1, using the target inter-vehicle distance that is set with respect to the target vehicle.

In step S9, the control command value calculation unit 42 drives the accelerator opening actuator and the brake control actuator in the actuators 17, based on the calculated vehicle speed command value and thereby controls the vehicle speed of the own vehicle 1. Subsequently, the process terminates.

Advantageous Effects of Embodiment (1) The controller 16 executes processing of determining whether or not a first other vehicle traveling on a second lane, the second lane merging with a first lane on which the own vehicle 1 travels in front of the own vehicle 1, is traveling diagonally in front of the own vehicle 1 and processing of, when determining that the first other vehicle is traveling diagonally in front of the own vehicle 1, controlling vehicle speed of the own vehicle 1 in such a way that a front-rear direction distance from a rear-end position of the first other vehicle to a front-end position of the own vehicle 1 in a front-rear direction of the first lane is shorter than a first target inter-vehicle distance in vehicle speed control to maintain an inter-vehicle distance to a preceding vehicle traveling in front of the own vehicle 1 on the first lane.

Because of this configuration, the own vehicle 1 can be easily positioned ahead of a following vehicle at a time point at which the own vehicle 1 that has reached a vicinity of a merging point detects the following vehicle of the first other vehicle. As a result, when the following vehicle reaches the merging point, the following vehicle can easily enter a space behind the own vehicle 1. Thus, since it becomes unnecessary to rapidly decelerate or rapidly accelerate to provide a space for the following vehicle to enter the first lane, a sense of anxiety that drivers of the own vehicle and the following vehicle feel can be reduced.

(2) The controller 16 may control vehicle speed of the own vehicle 1 in such a way that an inter-vehicle distance between the first other vehicle and the own vehicle 1 is shorter than the first target inter-vehicle distance until after the first other vehicle makes a lane change to the first lane in front of the own vehicle 1, a predetermined time elapses, the own vehicle 1 travels a predetermined distance, or the own vehicle 1 passes an end point of a merging section of the first lane and the second lane, and control vehicle speed of the own vehicle 1 in such a way that an inter-vehicle distance between the own vehicle 1 and the first other vehicle coincides with the first target inter-vehicle distance after the predetermined time elapses, the own vehicle I travels the predetermined distance, or the own vehicle 1 passes the end point.

Because of this configuration, it is possible to prevent a following vehicle of the first other vehicle from making a lane change to the front of the own vehicle 1, following the first other vehicle.

(3) When determining that the first other vehicle is traveling diagonally in front of the own vehicle 1, the controller 16 may set a second target inter-vehicle distance, the second target inter-vehicle distance being shorter than the first target inter-vehicle distance, as a target value of the front-rear direction distance, and control vehicle speed of the own vehicle 1 in such a way that the front-rear direction distance coincides with the second target inter-vehicle distance.

Because of this configuration, the vehicle speed of the own vehicle 1 can be controlled in such a way that the front-rear direction distance is shorter than the first target inter-vehicle distance.

(4) The controller 16 may limit deceleration in the case of extending the front-rear direction distance to the second target inter-vehicle distance in such a way that the deceleration becomes smaller than an allowable upper limit of deceleration in vehicle speed control to maintain an inter-vehicle distance to the preceding vehicle.

In addition, the controller 16 may set an upper limit of a change rate of vehicle speed in the case of reducing the front-rear direction distance to the second target inter-vehicle distance to a value larger than an upper limit of a change rate of vehicle speed in the case of extending an inter-vehicle distance between the own vehicle 1 and the first other vehicle to the second target inter-vehicle distance.

In addition, the controller 16 may set responsiveness in starting vehicle speed control to reduce the front-rear direction distance to the second target inter-vehicle distance higher than responsiveness in starting vehicle speed control to extend the front-rear direction distance to the second target inter-vehicle distance.

Because of this configuration, the inter-vehicle distance between the own vehicle 1 and the first other vehicle can be easily reduced. Thus, when the own vehicle I reaches the merging point, the own vehicle 1 can be easily positioned ahead of the following vehicle of the first other vehicle.

(5) The controller 16 may execute processing of calculating one half of a product of vehicle speed of the first other vehicle and a standard time headway as an inter-vehicle distance upper limit, and processing of setting a distance greater than or equal to an inter-vehicle distance lower limit, the inter-vehicle distance lower limit being set in advance as a shortest inter-vehicle distance allowing the own vehicle 1 to follow deceleration of a preceding vehicle, and less than or equal to the inter-vehicle distance upper limit as the second target inter-vehicle distance.

Setting the second target inter-vehicle distance to a value less than or equal to the inter-vehicle distance upper limit enables the inter-vehicle distance between the own vehicle 1 and the first other vehicle to be easily set less than or equal to half of the inter-vehicle distance between the first other vehicle and the following vehicle. Because of this configuration, even when the inter-vehicle distance between the first other vehicle and the following vehicle is shorter than a standard inter-vehicle distance, the own vehicle 1 can reach the merging point earlier than the following vehicle.

Setting the second target inter-vehicle distance to a value greater than or equal to the inter-vehicle distance lower limit enables the own vehicle 1 and the first other vehicle to be prevented from excessively coming close to each other even when the first other vehicle makes a lane change to the first lane. Because of this configuration, a sense of anxiety that the drivers of the own vehicle 1 and the first other vehicle feel can be reduced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

1 Own vehicle
2a First lane
2b Second lane
3 Second other vehicle
4 Wall
5 First other vehicle
6 Following vehicle

The invention claimed is:

1. A vehicle control method causing a controller to execute:
   processing of determining whether or not a first other vehicle traveling diagonally in front of an own vehicle is a vehicle traveling in a second lane, the second lane merging with a first lane on which the own vehicle travels in front of the own vehicle;
   processing of, when determining that the first other vehicle is traveling on the second lane merging with the first lane, setting a second target inter-vehicle distance with respect to the first other vehicle in vehicle speed control to maintain a front-rear direction distance from a rear-end position of the first other vehicle to a front-end position of the own vehicle in a front-rear direction of the first lane in such a way the second target inter-vehicle distance is shorter than a first target inter-vehicle distance with respect to a preceding vehicle in vehicle speed control to maintain an inter-vehicle distance to the preceding vehicle traveling in front of the own vehicle on the first lane; and
   processing of controlling vehicle speed of the own vehicle in such a way that the front-rear direction distance coincides with the second target inter-vehicle distance.

2. The vehicle control method according to claim 1, wherein the controller controls vehicle speed of the own vehicle in such a way that an inter-vehicle distance between the first other vehicle and the own vehicle is shorter than the first target inter-vehicle distance until after the first other vehicle makes a lane change to the first lane in front of the own vehicle, a predetermined time elapses, the own vehicle travels a predetermined distance, or the own vehicle passes an end point of a merging section of the first lane and the second lane, and
   controls vehicle speed of the own vehicle in such a way that an inter-vehicle distance between the own vehicle and the first other vehicle coincides with a first target inter-vehicle distance after the predetermined time elapses, the own vehicle travels the predetermined distance, or the own vehicle passes the end point.

3. The vehicle control method according to claim 1, wherein the vehicle control method limits deceleration in a case of extending the front-rear direction distance to the second target inter-vehicle distance in such a way that the deceleration becomes smaller than an allowable upper limit of deceleration in vehicle speed control to maintain an inter-vehicle distance to the preceding vehicle.

4. The vehicle control method according to claim 1, wherein the vehicle control method sets an upper limit of a change rate of vehicle speed in a case of reducing the front-rear direction distance to the second target inter-vehicle distance to a value larger than an upper limit of a change rate of vehicle speed in a case of extending an inter-vehicle distance between the own vehicle and the first other vehicle to the second target inter-vehicle distance.

5. The vehicle control method according to claim 1, wherein the vehicle control method sets responsiveness in starting vehicle speed control to reduce the front-rear direction distance to the second target inter-vehicle distance higher than responsiveness in starting vehicle speed control to extend the front-rear direction distance to the second target inter-vehicle distance.

6. The vehicle control method according to claim 1, the vehicle control method causing the controller to execute:
  processing of calculating one half of a product of vehicle speed of the first other vehicle and a standard time headway as an inter-vehicle distance upper limit; and
  processing of setting a distance greater than or equal to an inter-vehicle distance lower limit, the inter-vehicle distance lower limit being set in advance as a shortest inter-vehicle distance allowing the own vehicle to follow deceleration of a preceding vehicle, and less than or equal to the inter-vehicle distance upper limit as the second target inter-vehicle distance.

7. A vehicle control device comprising a controller configured to execute:
  processing of determining whether or not a first other vehicle traveling diagonally in front of an own vehicle is a vehicle traveling in a second lane, the second lane merging with a first lane on which the own vehicle travels in front of the own vehicle;
  processing of, when determining that the first other vehicle is traveling on the second lane merging with the first lane, setting a second target inter-vehicle distance with respect to the first other vehicle in vehicle speed control to maintain a front-rear direction distance from a rear-end position of the first other vehicle to a front-end position of the own vehicle in a front-rear direction of the first lane in such a way the second target inter-vehicle distance is shorter than a first target inter-vehicle distance with respect to a preceding vehicle in vehicle speed control to maintain an inter-vehicle distance to the preceding vehicle traveling in front of the own vehicle on the first lane; and
  processing of controlling vehicle speed of the own vehicle in such a way that the front-rear direction distance coincides with the second target inter-vehicle distance.

* * * * *